(12) United States Patent
Oda et al.

(10) Patent No.: US 6,692,555 B2
(45) Date of Patent: Feb. 17, 2004

(54) INTERNAL COMBUSTION ENGINE AIR CLEANER AND ADSORPTION FILTER

(75) Inventors: Kouichi Oda, Kariya (JP); Minoru Honda, Kariya (JP); Yoshinori Inuzuka, Okazaki (JP); Masaki Takeyama, Okazaki (JP); Takashi Nishimoto, Toyota (JP); Yuji Mochizuki, Ogasa-gun (JP); Tokio Oi, Ogasa-gun (JP)

(73) Assignees: Toyoda Boshoku Corporation, Kariya (JP); Nippon Soken, Inc., Nishio (JP); Toyota Jidosha Kabushiki Kaisha, Toyota (JP); Cataler Corporation, Daito-Cho (JP)

( * ) Notice: Subject to any disclaimer, the term of this patent is extended or adjusted under 35 U.S.C. 154(b) by 19 days.

(21) Appl. No.: 10/095,521

(22) Filed: Mar. 13, 2002

(65) Prior Publication Data

US 2002/0129711 A1 Sep. 19, 2002

(30) Foreign Application Priority Data

Mar. 16, 2001 (JP) .......................... 2001-075614

(51) Int. Cl.[7] .......................... B01D 53/04; F02M 33/02
(52) U.S. Cl. .............. 96/134; 96/154; 55/318; 55/516; 55/385.3; 123/198 E
(58) Field of Search ............. 96/134, 135, 147, 96/154; 55/315, 318, 516, 518, 519, 385.3, 497, DIG. 20; 123/198 E

(56) References Cited

U.S. PATENT DOCUMENTS

| | | | | | |
|---|---|---|---|---|---|
| 3,727,597 | A | * | 4/1973 | Hensler | 123/519 |
| 3,747,303 | A | * | 7/1973 | Jordan | 96/135 |
| 3,785,129 | A | * | 1/1974 | Szmutko | 55/419 |
| 4,268,289 | A | * | 5/1981 | Polaner | 55/486 |
| 4,279,630 | A | * | 7/1981 | Nakamura et al. | 96/138 |
| 4,418,662 | A | * | 12/1983 | Engler et al. | 96/133 |
| 4,699,681 | A | * | 10/1987 | Kasmark et al. | 156/264 |
| 6,336,948 | B1 | * | 1/2002 | Inoue et al. | 55/486 |
| 6,383,268 | B2 | * | 5/2002 | Oda | 96/134 |
| 6,464,761 | B1 | * | 10/2002 | Bugli | 96/135 |

FOREIGN PATENT DOCUMENTS

| | | |
|---|---|---|
| JP | U 61-58676 | 4/1986 |
| JP | Y2 63-13418 | 4/1988 |
| JP | A 11-82192 | 3/1999 |

* cited by examiner

Primary Examiner—Frank M. Lawrence
(74) Attorney, Agent, or Firm—Oliff & Berridge, PLC

(57) ABSTRACT

A sheet-like adsorption filter formed by sandwiching particulate activated carbon with heat-resistant nets and nonwoven fabric sheets that have a percentage of void of 90% or higher, is disposed at an internal combustion engine side of a filter element.

12 Claims, 2 Drawing Sheets

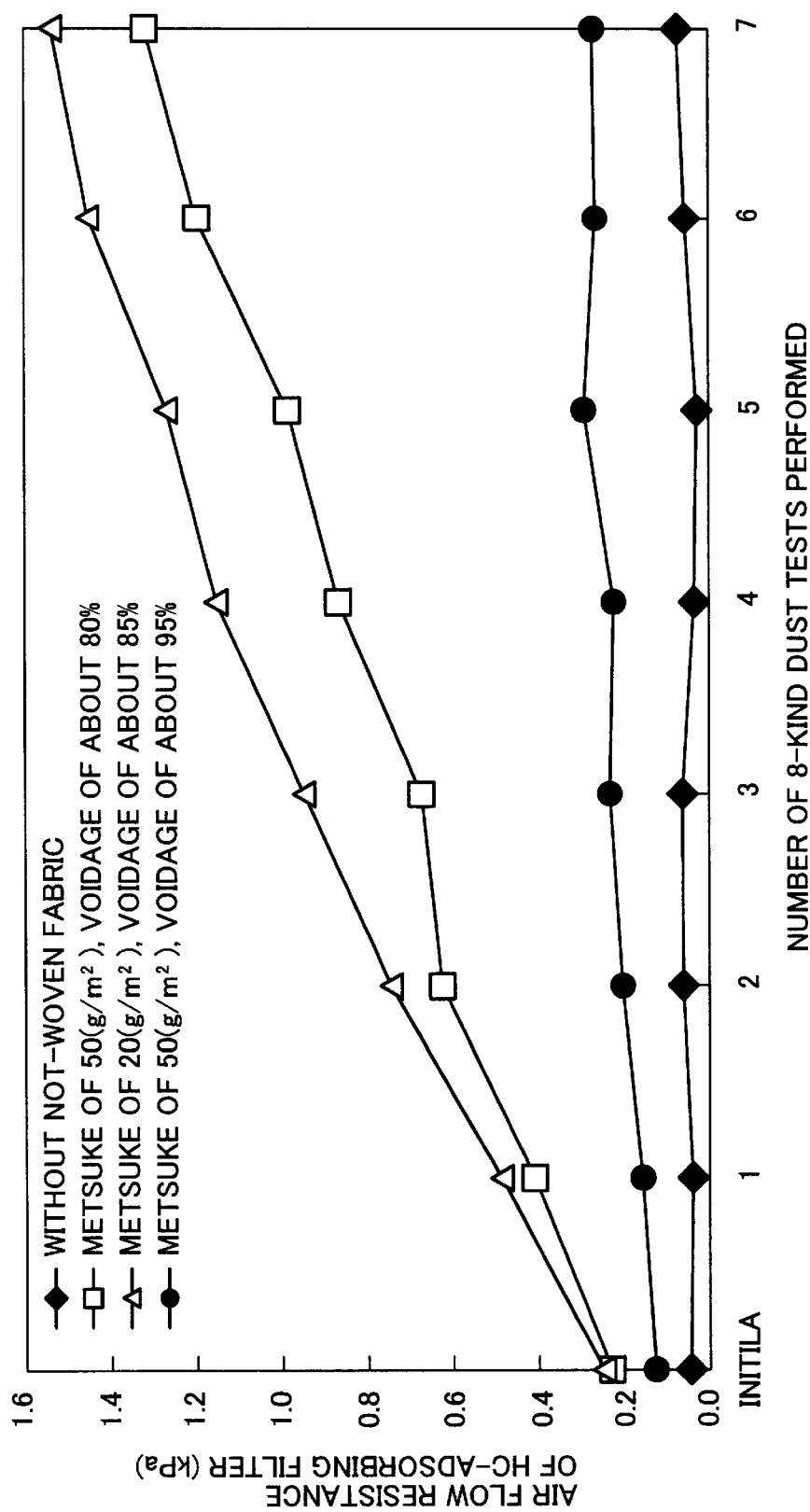

INTERNAL COMBUSTION ENGINE AIR CLEANER AND ADSORPTION FILTER

INCORPORATION BY REFERENCE

The disclosure of Japanese Patent Application No. 2001-75614 filed on Mar. 16, 2001 including the specification, drawings and abstract is incorporated herein by reference in its entirety.

BACKGROUND OF THE INVENTION

1. Field of Invention

The invention relates to an air cleaner and an adsorption filter for an internal combustion engine. More particularly, the invention relates to an air cleaner and an adsorption filter for an internal combustion engine which are capable of preventing an air cleaner element from being damaged by a backfire of the engine and preventing fuel vapor leaking via an intake system from diffusing into external air.

2. Description of Related Art

Motor vehicle engines are equipped with an air cleaner for filtering external air. In recent years, there is provided an air cleaner having an adsorbent for preventing fuel vapor leakage via an intake system from flowing out into the atmosphere.

As a measure for disposing an adsorbent for adsorbing fuel vapor leaking via an intake system, an arrangement has been proposed in which a sheet formed by sandwiching an adsorbent between two layers of filter paper or non-woven fabric is fixed in an air cleaner (Japanese Utility Model Laid-open Application No. 60-14269).

However, such a known arrangement has drawbacks because a normal air cleaner element and an adsorbent-equipped element are disposed in parallel. Firstly, there is a danger of fuel vapor leaking out into the atmosphere through the normal element. Secondly, the filter paper or non-woven fabric of the adsorbent-equipped element becomes easily clogged with dust, so that the air-flow resistance of the adsorbent-equipped element considerably increases and the fuel vapor adsorbing performance considerably deteriorates.

Furthermore, since the filter paper or non-woven fabric is poor in heat resistance, the filter paper or non-woven fabric of the adsorbent-equipped element is easily damaged by backfire, so that activated carbon or the like may fall out of the adsorbent-equipped element.

SUMMARY OF THE INVENTION

It is an object of the invention to provide an air cleaner and an adsorption filter for an internal combustion engine which are capable of reliably blocking leakage of fuel vapor into the atmosphere and preventing the clogging thereof with dust and damage thereto caused by backfire.

A first aspect of the invention is an air cleaner for an internal combustion engine which includes a housing that has an intake air inlet for introducing an external air and an intake air outlet for supplying an intake air to the internal combustion engine, an air cleaner element disposed within the housing for filtering the external air introduced, and adsorption means disposed at an internal combustion engine side of the air cleaner element for adsorbing a fuel vapor. The adsorption means includes a particulate activated carbon, a heat-resistant mesh member for holding the particulate activated carbon, and a non-woven fabric.

According to the first aspect of the invention, when the intake manifold has a negative pressure due to operation of the engine, air is drawn into the engine sequentially via the air cleaner element and the adsorption means in that order.

If a normal woven fabric, which is formed basically by arranging warp yarns and weft yarns in a two-dimensional fashion, is used in an air cleaner, it is necessary to expand the gap between yarns in order to enhance the air permeability. Therefore, if such a woven fabric is used to hold the particulate activated carbon, it becomes difficult to effectively prevent the particulate activated carbon from falling off.

In contrast, a non-woven fabric is formed by entangling fiber in a complicated and random fashion. Therefore, the non-woven fabric has an excellent capability of holding or trapping fine powder, and therefore can effectively prevent activated carbon powder from falling off.

Furthermore, air passes through the non-woven fabric after dust has been removed from the air by the filter element. Therefore, the clogging of the non-woven fabric is more effectively prevented.

While the engine is stopped, air is not introduced, so that fuel vapor evaporated from deposits of fuel inside the engine enters the internal combustion engine air cleaner. However, the fuel vapor adsorbs to the particulate activated carbon of the adsorption means, and is therefore substantially prevented from escaping into the atmosphere.

Furthermore, if the internal combustion engine backfires, the heat-resistant mesh member blocks passage of fire, thereby preventing damage to the non-woven fabric and damage to the air cleaner element.

In the internal combustion engine air cleaner of the first aspect of the invention, the non-woven fabric may have a percentage of void of at least 90%. As the percentage of void of the non-woven fabric is set at 90% or higher, increase in pressure loss can be curbed, and the clogging can be prevented.

In the internal combustion engine air cleaner of the first aspect of the invention, the heat-resistant mesh member may have a mesh size that is smaller than a particle size of the particulate activated carbon. As the mesh size of the heat-resistant mesh member is set smaller than the particle size of the particulate activated carbon, the particulate activated carbon can be reliably held by the heat-resistant mesh member.

In the internal combustion engine air cleaner of the first aspect of the invention, it is possible that the non-woven fabric has been processed for a flame retardancy. The non-woven fabric processed for flame retardancy will prevent damages thereto even if the mesh member should fail to block passage of fire or the mesh member should have a damage.

In the internal combustion engine air cleaner of the first aspect of the invention, the non-woven fabric may be formed by a flame retardant fiber. The non-woven fabric formed by a flame retardant fiber will prevent damage thereto even if the mesh member should fail to block passage of fire or the mesh member should have damage.

In the internal combustion engine air cleaner of the first aspect of the invention, the non-woven fabric may be formed by an activated carbon fiber. As the non-woven fabric is formed by an activated carbon fiber, the activated carbon fiber also adsorbs fuel vapor, thereby further enhancing the adsorption capability of the adsorption means.

A second aspect of the invention is an adsorption filter for use in an internal combustion engine air cleaner which has a housing that has an intake air inlet for introducing an external air and an intake air outlet for supplying an intake air to the internal combustion engine, and an air cleaner element disposed within the housing for filtering the external air introduced, and which is disposed at an internal combustion engine side of the air cleaner element. The adsorption filter includes a particulate activated carbon, a heat-resistant mesh member for holding the particulate activated carbon, and a non-woven fabric.

The adsorption filter of the second aspect of the invention can be used by disposing it at the internal combustion engine side of the air cleaner element. In this case, the adsorption filter achieves substantially the same advantages as those of the first aspect of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a graph indicating results of an eight-kind dust test according to JIS D 1612.

DETAILED DESCRIPTION OF PREFERRED EMBODIMENTS

A preferred embodiment of the invention will be described hereinafter with reference to FIGS. 1 and 2.

Figure 2:
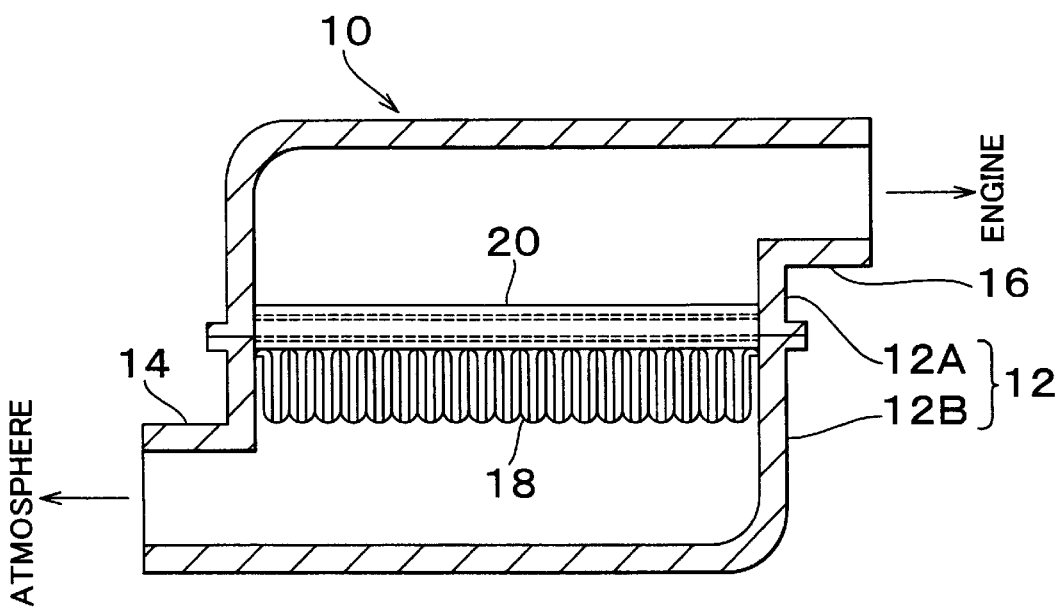
FIG. 2 is a sectional view of an air cleaner in accordance with an embodiment of the invention.

Referring to FIG. 2, an air cleaner 10 has a housing 12.

The housing 12 is formed by an upper case 12A and a lower case 12B. The upper case 12A and the lower case 12B are air-tightly fixed by a fixing member (not shown), and are thus firmly joined together.

The lower case 12B has an inlet 14 that is formed as a portion of the lower case 12B. The upper case 12A has an outlet 16 that is formed as a portion of the upper case 12A.

The outlet 16 is connected to a cylinder of an automotive engine via an intake manifold (not shown).

A filter element 18 that traps dust in air and an adsorption filter 20 that adsorbs fuel vapor are disposed in the housing 12. The filter element 18 can be replaced with new ones by separating the upper case 12A from the lower case 12B.

The filter element 18 has a thin sheet-type element member that is folded in an accordion fashion. The filter element 18 has a generally flat rectangular thick plate shape.

The adsorption filter 20 is disposed at a downstream side of the filter element 18 (a side closer to the internal combustion engine). Thus, the adsorption filter 20 and the filter element 18 are in an in-line positional relationship in an air flow passage.

Figure 1:
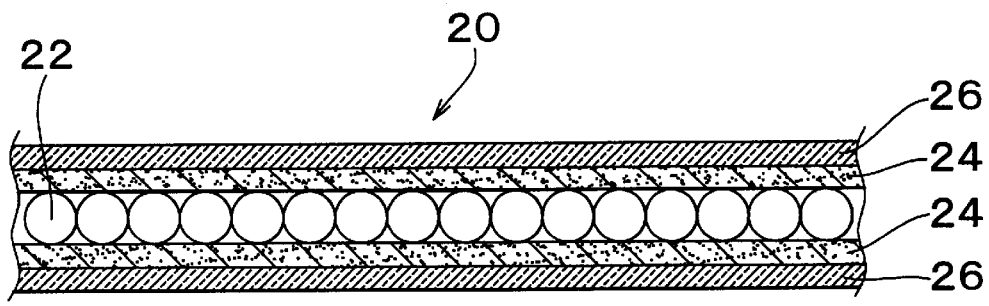
FIG. 1 is an enlarged sectional view of an adsorption filter for use in an air cleaner in accordance with an embodiment of the invention.

As shown in FIG. 1, the adsorption filter 20 in this embodiment has a sheet configuration in which many activated carbon particles 22 are sandwiched by non-woven fabric sheets 24 and heat-resistant nets 26.

The heat-resistant nets 26 have a mesh size that is smaller than the particle size of the particulate activated carbon 22. Therefore, the activated carbon particles 22 can be held by the heat-resistant nets 26 alone.

The heat-resistant nets 26 also serve to prevent flames from reaching and damaging the non-woven fabric sheets 24 when the engine backfires.

Specific examples of the material of the heat-resistant nets 26 include polypropylene (e.g., having a melting point of 160° C. or higher and a filament diameter of 0.3 mm or greater), glass fiber, nylon, etc. The heat-resistant nets 26 may also be formed from other materials.

The duration of contact of the heat-resistant nets 26 with a backfire is very short (e.g., approximately less than 0.1 second). Therefore, if the heat-resistant nets 26 are made of filaments having at least a certain thickness, the filaments are hardly damaged by a backfire, and therefore the heat-resistant temperature thereof does not need to be very high. An appropriate melting point of the material of the heat-resistant nets 26 is 100° C. or higher.

The non-woven fabric sheets 24 are provided for preventing fall-out of abrasion powder of activated carbon, which cannot be prevented by the heat-resistant nets 26 alone. Therefore, the mesh size of the non-woven fabric sheets 24 is set smaller than the mesh size of the heat-resistant nets 26. The percentage of void (by volume) of the non-woven fabric sheets 24 is set at 90% or higher.

Operation of the air cleaner 10 of the embodiment will now be described.

When the intake manifold has a negative pressure due to the operation of the engine, air is drawn into the housing 12 via the inlet 14, and passes through the filter element 18 and the adsorption filter 20, and is drawn into the engine via the outlet 16 and the intake manifold. Dust in air is trapped by the filter element 18.

In this embodiment, the percentage of void of the non-woven fabric sheets 24 is set at 90% or higher. Therefore, increase in the pressure loss can be curbed, and the clogging of the non-woven fabric sheets 24 can be prevented. Furthermore, since air passes through the non-woven fabric sheets 24 after dust has been removed from the air by the filter element 18, the clogging of the non-woven fabric sheets 24 can be more effectively prevented.

Still further, the provision of a heat-resistant net 26 at the engine-side of the non-woven fabric sheets 24 protects the non-woven fabric sheets 24 from being damaged by a backfire of the internal combustion engine. Similarly, damage to the filter element 18 can also be prevented.

While the engine is stopped, air is not introduced, so that fuel vapor (gasoline vapor in the case of a gasoline engine) evaporated from deposits of fuel inside the engine enters the air cleaner 10 via the outlet 16. However, the fuel vapor adsorbs to the particulate activated carbon 22 of the adsorption filter 20, and is therefore substantially prevented from escaping into the atmosphere.

The gasoline vapor adsorbed by the particulate activated carbon 22 is released by air drawn in during operation of the engine, so that the adsorbing capability of the particulate activated carbon 22 is recovered. Thus, the particulate activated carbon 22 can be repeatedly used.

In some cases, the intake system experiences backflow of atomized oil from the engine. If oil deposits on the particulate activated carbon 22, pores of the particulate activated carbon 22 are closed by oil, and therefore the adsorbing capability considerably deteriorates. In this embodiment, however, a non-woven fabric sheet 24 is provided at the engine-side of the particulate activated carbon 22. Therefore, oil does not deposit directly on the particulate activated carbon 22, and reduction in the absorbing capability due to oil deposition does not occur.

As for the material of the filaments of the non-woven fabric sheets 24, normally-used synthetic fibers and the like are appropriate. However, it is more preferable to perform a flame-retarding process on such a fiber or the like (e.g., to blend a phosphorus-based flame retardant material (non-halogen type material)) into a binder, or to use a flame retardant fiber (e.g., a carbon fiber).

It is also possible to use an activated carbon fiber as a fiber of the non-woven fabric sheets 24 in order to further improve the adsorbing capability. If the particulate activated carbon 22 has good desorption performance, some low-boiling point components of adsorbed fuel vapor are readily desorbed from the particulate activated carbon 22, and may leak out. However, the activated carbon fiber of the non-woven fabric sheets 24 will quickly adsorb such a small amount of leakage of low-boiling point components because activated carbon fibers generally have great adsorption rate.

Furthermore, although in the foregoing embodiment, many activated carbon particles 22 are sandwiched and held between the non-woven fabric sheets 24, the activated carbon particles 22 may be adhered to surfaces of the non-woven fabric sheets 24 by disposing the activated carbon particles 22 on the surfaces of the non-woven fabric sheets 24 after applying an adhesive to the surfaces.

Still further, although in the foregoing embodiment, the heat-resistant nets 26 are disposed on the opposite sides of the non-woven fabric sheets 24, it is not altogether necessary to dispose heat-resistant nets 26 on two sides according to the invention. That is, it is possible to dispose a heat-resistant net only at one side. If a heat-resistant net 26 is disposed only at one side of the non-woven fabric sheets 24, it is preferable that the heat-resistant net 26 be disposed at a downstream side of the non-woven fabric sheets 24 (a side closer to internal combustion engine). In this case, too, it is preferable that the fiber of the non-woven fabric sheets 24 be thick (preferably, 30 μm or greater in thickness), or that the fiber of the non-woven fabric sheets 24 be subjected to a flame retardation process, or that the non-woven fabric sheets 24 be formed of a flame retardant fiber, if there is a possibility of contact of the non-woven fabric sheets 24 with backfire.

TEST EXAMPLE

Four kinds of adsorption filters having different specifications were formed. An eight-kinds-of-dust test according to JIS D 1612 was performed seven times on each adsorption filter to check changes in the air flow resistance of each filter. Test results are indicated in the graph of FIG. 3.

According to the test results, the adsorption filters incorporating non-woven fabric sheets having a percentage of void of about 85% or less became clogged, and exhibited great increases in air flow resistance whereas the filter incorporating a non-woven fabric sheet having a percentage of void of about 95% exhibited substantially no changes in air flow resistance.

This indicates that, for a practical use, it is appropriate to set the percentage of void of the non-woven fabric sheet at 90% or higher.

As is apparent from the foregoing description, the air cleaner and the adsorption filter for an internal combustion engine in accordance with the embodiment achieve excellent advantages. That is, the air cleaner and the adsorption filter reliably prevent leakage of fuel vapor into the atmosphere, and prevent the clogging of the adsorption filter with dust and prevent damages thereto by backfire.

While the invention has been described with reference to what are presently considered to be preferred embodiments thereof, it is to be understood that the invention is not limited to the disclosed embodiments or constructions. On the contrary, the invention is intended to cover various modification and equivalent arrangements. In addition, while the various elements of the invention are shown in various combinations and configurations, which are exemplary, other combinations and configurations, including more, less or only a single embodiment, are also within the spirit and scope of the invention.

What is claimed is:

1. An air cleaner for an internal combustion engine, comprising:

a housing that has an intake air inlet for introducing an external air and an intake air outlet for supplying an intake air to the internal combustion engine;

an air cleaner element disposed within the housing for filtering the external air introduced; and adsorption means disposed at an internal combustion engine side of the air cleaner element for adsorbing a fuel vapor, wherein the adsorption means includes a particulate activated carbon, a heat-resistant mesh member for holding the particulate activated carbon, and a non-woven fabric, the non-woven fabric holds the particulate activated carbons from an upstream side and a downstream side of the intake air, and the heat-resistant mesh member covers at least one side of the non-woven fabric, wherein the one side is closer to the internal combustion engine.

2. An air cleaner according to claim 1, wherein the non-woven fabric has a percentage of void of at least 90%.

3. An air cleaner according to claim 1, wherein the heat-resistant mesh member has a mesh size that is smaller than a particle size of the particulate activated carbon.

4. An air cleaner according to claim 1, wherein the non-woven fabric has been processed for a flame retardancy.

5. An air cleaner according to claim 1, wherein the non-woven fabric is formed by a flame retardant fiber.

6. An air cleaner according to claim 1, wherein the non-woven fabric is formed by an activated carbon fiber.

7. An adsorption filter for use in an internal combustion engine air cleaner which has a housing that has an intake air inlet for introducing an external air and an intake air outlet for supplying an intake air to the internal combustion engine, and an air cleaner element disposed within the housing for filtering the external air introduced, and which is disposed at an internal combustion engine side of the air cleaner element, the adsorption filter comprising:

a particulate activated carbon;

a heat-resistant mesh member for holding the particulate activated carbon; and a non-woven fabric, wherein
   the non-woven fabric holds the particulate activated carbons from an upstream side and a downstream side of the intake air, and the heat-resistant mesh member covers at least one side of the non-woven fabric, wherein the one side is closer to the internal combustion engine.

8. An adsorption filter according to claim 7, wherein the non-woven fabric has a percentage of void of at least 90%.

9. An adsorption filter according to claim 7, wherein the heat-resistant mesh member has a mesh size that is smaller than a particle size of the particulate activated carbon.

10. An adsorption filter according to claim 7, wherein the non-woven fabric has been processed for a flame retardancy.

11. An adsorption filter according to claim 7, wherein the non-woven fabric is formed by a flame retardant fiber.

12. An adsorption filter according to claim 7, wherein the non-woven fabric is formed by an activated carbon fiber.

* * * * *